DE FOREST A. LAPHAM AND A. M. LOUNGWAY.
TOOL HOLDER AND REAMER.
APPLICATION FILED JUNE 9, 1917.
1,311,406.
Patented July 29, 1919.
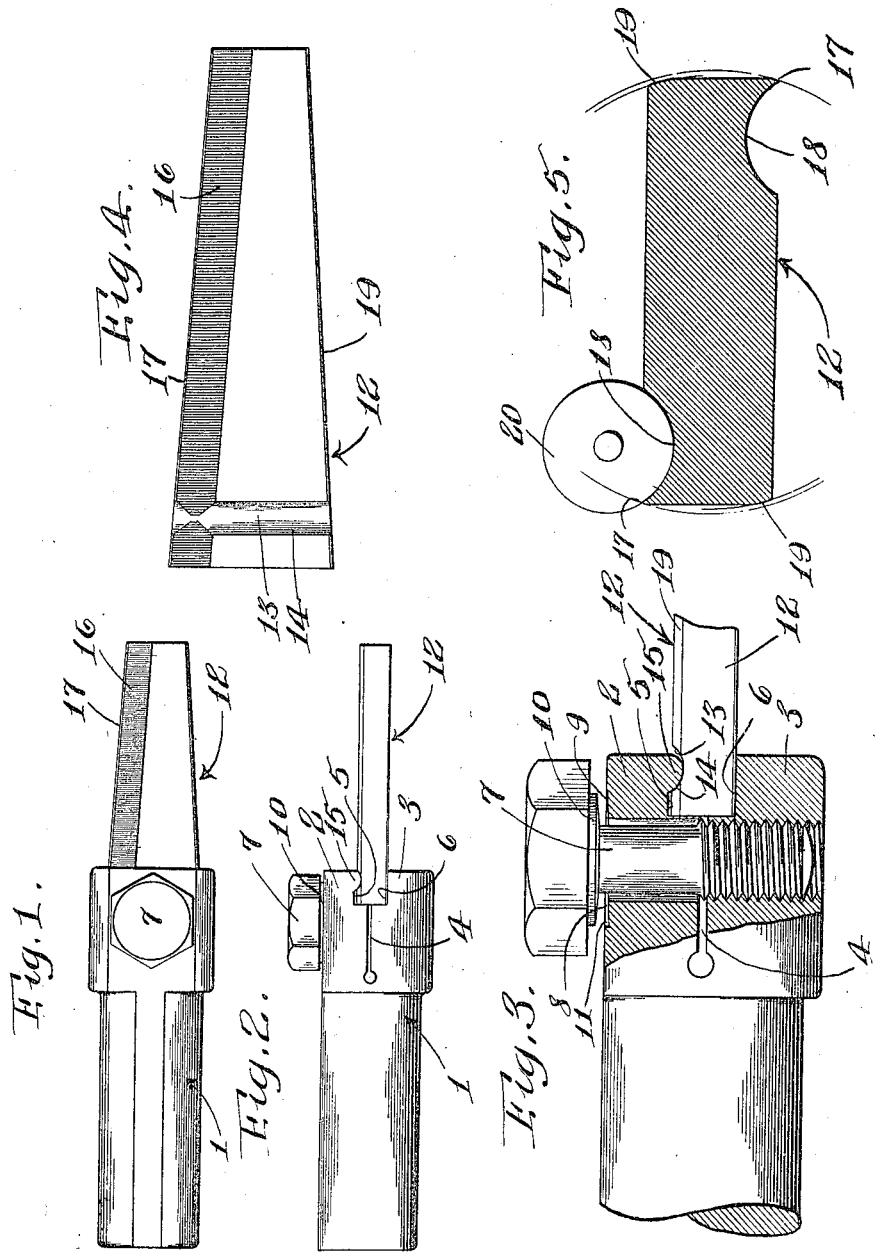
WITNESSES:
INVENTORS.
De Forest A. Lapham
BY Arthur M. Loungway
Parsons & Bodell
ATTORNEYS.

UNITED STATES PATENT OFFICE.

DE FOREST A. LAPHAM AND ARTHUR M. LOUNGWAY, OF SYRACUSE, NEW YORK.

TOOL-HOLDER AND REAMER.

1,311,406.

Specification of Letters Patent. Patented July 29, 1919.

Application filed June 9, 1917. Serial No. 173,793.

*To all whom it may concern:*

Be it known that we, DE FOREST A. LAPHAM and ARTHUR M. LOUNGWAY, citizens of the United States, and residents of Syracuse, in the county of Onondaga and State of New York, have invented a certain new and useful Tool-Holder and Reamer, of which the following is a specification.

This invention relates to metal cutting tools and has for its object a particularly simple and efficient construction of tool holder and tool whereby the tool is tightly held in the holder, and further has for its object a tool having particularly simple and efficient means for preventing the chips from clogging and the tool from becoming caught in the work; and the invention consists in the combinations and constructions hereinafter set forth and claimed.

In describing this invention, reference is had to the accompanying drawings in which like characters designate corresponding parts in all the views.

Figures 1 and 2 are elevations, taken at a right angle to each other, of the tool holder and tool therein.

Fig. 3 is an enlarged elevation, partly in section, similar to Fig. 2.

Fig. 4 is a plan view of a reamer constructed in accordance with our invention and adapted to be held in our tool holder.

Fig. 5 is an enlarged transverse sectional view through the reamer.

1 designates the tool holder which is formed with opposing jaws 2, 3, the tool holder being here shown as split longitudinally as at 4 to form the opposing jaws and is provided with complemental recesses 5, 6 therein on opposite sides of the split 4.

The jaws are clamped together by suitable means as a screw 7, threading in the jaw 3 and extending through an unthreaded opening in the jaw 2. The jaw 2 has a raised surface located nearer the free end of the jaw than the other end thereof in order to be engaged by the head of the screw before the head of the screw engages the jaw near the base thereof, thus effecting a greater clamping movement of the jaw at the free end thereof than at the base.

As here shown, the jaw 2 is provided in its outer face with a countersink 8 around the bore through which the screw 7 extends, and the bottom of this countersink is raised at 9 on the side of the countersink near the free end of the jaw and the head of the screw is provided with a raised discoidal part 10 which engages the raised surface 9 before it engages the deeper portion 11 of the countersink, and effects a quick clamping action of the jaw 2 toward the jaw 3.

12 designates the reamer or cutter having its end fitted in the recesses 5, 6. The holder and the cutter 12 have means by which the cutter is drawn endwisely into the recesses 5, 6 during the clamping action of the screw 7, and is caused to abut squarely against the rear sides of the recesses 5, 6.

As here shown the reamer is provided with a transverse groove 13, the rear wall of which is inclined at 14 and one of the jaws as the jaw 2 is provided with a raised transverse rib 15 for entering the groove 13, the rib having a surface complemental to the surface 14 whereby during the clamping action of the jaws 2, 3, the tool or reamer 12 is cammed or wedged rearwardly.

The reamer 12 is provided with means by which clogging of the chips cut thereby is prevented and also with means for preventing the reamer from being caught in the work or, in shop parlance, from "hogging-in".

The means for preventing clogging as here shown comprises minute parallel ridges in the nature of threads 16 arranged at an inclined angle to the cutting edge 17 so that the chips are worked or caused to travel toward the free end of the tool during the rotation thereof and not to accumulate in any one place. These minute ridges are arranged on the bottom of the channel 18 running along the cutting edge 17 and extending in lines at a right angle to the lengthwise axis or axis of rotation of the reamer 12, that is, the axis of rotation of the tool.

The means by which the hogging-in is prevented acts to stop the cutter when it tends to take a too deep cut and this means comprises a stop surface 19 arranged in the rear of the cutting edge 17 with respect to the direction of rotation of the reamer and located a slightly less distance from the axis of rotation than the cutting edge. Hence, when the cutting edge tends to take a too deep cut the surface 19 will abut against the work and prevent the tool from cutting deeper during continued cutting. The stop surface 19 is spaced apart from the cutting edge by a surface 19ᵃ located nearer the axis of the reamer than the cutting edge 17 and the stop surface 19, the surface 19ᵃ forming a clearance between the cutting edge and the stop surface.

Heretofore reamers have been backed off to such a great extent that no stop surface is provided or contemplated.

The ridges 16 are formed by grinding the bottom of the channel 18 with a grinding wheel 20 arranged with its axis parallel to the axis of rotation of the tool 12 so that the marks or furrows left by the grinding wheel are in the form of ridges arranged at an inclined angle to the cutting edge 17.

Owing to the construction of the tool and holder, the tool is firmly held and cannot be detached, and owing to the construction of the reamer it cannot be stopped by accumulated chips and will be stopped in order to prevent breakage, by the surface 19 when the reamer tends to take a too deep cut. Heretofore the reamers became detached from the tool holder when they took a too deep cut, but as our tool holder is provided with means which firmly holds the tool and prevents detachment, the stop surfaces 19 act in conjunction with said tool holder to prevent breakage.

What we claim is:—

1. A reamer having a lengthwise cutting edge and a channel arranged adjacent said edge, the bottom of the channel being formed with transverse ridges arranged at an inclined angle to the cutting edge, substantially as and for the purpose set forth.

2. A reamer having a cutting edge arranged at an incline to the lengthwise axis or the axis of rotation of the reamer, and a channel extending along the cutting edge adjacent thereto, the bottom of the channel being formed with minute transverse ridges extending from the cutting edge in lines at a right angle to said axis, substantially as and for the purpose described.

3. A reamer having a cutting edge extending along one edge thereof, a stop shoulder in the rear of the cutting edge with respect to the direction of rotation of the reamer, the stop shoulder being located slightly nearer the axis of rotation of the reamer than the cutting edge, and a surface between the cutting edge and the stop shoulder which surface is of less radius from the axis of rotation of the reamer than the cutting edge and the stop shoulder, substantially as and for the purpose described.

In testimony whereof, we have hereunto signed our names, at Syracuse, in the county of Onondaga, and State of New York, this 19th day of March, 1917.

DE FOREST A. LAPHAM.
ARTHUR M. LOUNGWAY.

Copies of this patent may be obtained for five cents each, by addressing the "Commissioner of Patents, Washington, D. C."